United States Patent
Chen et al.

(10) Patent No.: US 11,410,277 B2
(45) Date of Patent: Aug. 9, 2022

(54) METHOD AND DEVICE FOR BLURRING IMAGE BACKGROUND, STORAGE MEDIUM AND ELECTRONIC APPARATUS

(71) Applicant: GUANGDONG OPPO MOBILE TELECOMMUNICATIONS CORP., LTD., Guangdong (CN)

(72) Inventors: Yan Chen, Guangdong (CN); Yaoyong Liu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 65 days.

(21) Appl. No.: 16/878,149

(22) Filed: May 19, 2020

(65) Prior Publication Data
US 2020/0334793 A1 Oct. 22, 2020

Related U.S. Application Data

(63) Continuation of application No. PCT/CN2018/121808, filed on Dec. 18, 2018.

(30) Foreign Application Priority Data
Jan. 5, 2018 (CN) .......................... 201810012457.2

(51) Int. Cl.
*G06K 9/00* (2022.01)
*G06T 5/00* (2006.01)
(Continued)

(52) U.S. Cl.
CPC .............. *G06T 5/002* (2013.01); *G06T 5/003* (2013.01); *G06T 7/0012* (2013.01); *G06T 7/11* (2017.01);
(Continued)

(58) Field of Classification Search
CPC ................................. G06T 5/002; G06T 7/11
See application file for complete search history.

(56) References Cited

U.S. PATENT DOCUMENTS 7,783,075 B2   8/2010  Zhang et al.
8,724,919 B2*  5/2014  Pillman .................. G06T 5/003
                                                    382/254

(Continued)

FOREIGN PATENT DOCUMENTS

CN    101827171 A    9/2010
CN    103366352 A   10/2013
(Continued)

OTHER PUBLICATIONS

Second Office Action of the Chinese application No. 201810012457.2, dated Oct. 23, 2020.
(Continued)

*Primary Examiner* — Hadi Akhavannik

(57) ABSTRACT

A method and device for blurring an image background, a storage medium, and an electronic apparatus. The method for blurring an image background comprises: using a preset classification model to divide an image to be processed into a foreground region and a background region (201); detecting a contour edge of a photographic subject in the foreground region obtained from the division (S202); and performing blurring on a background of the image according to the contour edge of the photographic subject (S203).

14 Claims, 8 Drawing Sheets

(51) Int. Cl.
*G06T 7/187* (2017.01)
*G06T 7/194* (2017.01)
*G06T 7/11* (2017.01)
*G06T 7/13* (2017.01)
*G06T 7/00* (2017.01)
*G06T 7/20* (2017.01)

(52) U.S. Cl.
CPC ............... *G06T 7/13* (2017.01); *G06T 7/187* (2017.01); *G06T 7/194* (2017.01); *G06T 7/20* (2013.01); *G06T 2207/20021* (2013.01); *G06T 2207/20072* (2013.01); *G06T 2207/20081* (2013.01); *G06T 2207/30201* (2013.01)

(56) References Cited

U.S. PATENT DOCUMENTS

| | | | | |
|---|---|---|---|---|
| 2008/0259154 | A1* | 10/2008 | Garrison | H04N 7/14 348/14.01 |
| 2009/0185757 | A1* | 7/2009 | Lee | G06T 5/004 382/266 |
| 2012/0327172 | A1* | 12/2012 | El-Saban | G06T 7/174 348/14.02 |
| 2013/0084007 | A1* | 4/2013 | Salamati | G06T 7/162 382/173 |
| 2013/0258138 | A1 | 10/2013 | Ma et al. | |
| 2015/0002545 | A1 | 1/2015 | Webster et al. | |

FOREIGN PATENT DOCUMENTS

| | | |
|---|---|---|
| CN | 104063865 A | 9/2014 |
| CN | 105825502 A | 8/2016 |
| CN | 105979165 A | 9/2016 |
| CN | 107122375 A | 9/2017 |
| CN | 107180430 A | 9/2017 |
| CN | 107301400 A | 10/2017 |
| CN | 107341805 A | 11/2017 |
| CN | 107370958 A | 11/2017 |
| CN | 107424159 A | 12/2017 |

OTHER PUBLICATIONS

International Search Report in the international application No. PCT/CN2018/121808, dated Mar. 20, 2019.
Yuan, Xuehan; "Image Pattern Learning and Application Based on Deconvolution Network", Chinese Masters Theses Full-text Batabase Information Science and Technology, Feb. 15, 2017, p. 15-34.
Zhao, Qian; Smart Video Image Processing Technology and Application, "Image edge detection", Sep. 30, 2016, p. 22-23.
First Office Action of the Chinese application No. 201810012457.2, dated May 19, 2020.
Written Opinion of the International Search Authority in the international application No. PCT/CN2018/121808, dated Mar. 20, 2019.
Martin Thoma: "A Survey of Semantic Segmentation", Arxiv. Org, Cornell University Library, 201 Olin Library Cornell University Ithaca, NY 14853, Feb. 21, 2016 (Feb. 21, 2016), XP080684993,* abstract * * p. 6, col. 1 * p. 9, col. 2 *.
Supplementary European Search Report in the European application No. 18898218.5, dated Feb. 8, 2021.
Huang Hongwei, Li Qingtong; "Image recognition for water leakage in shield tunnel based on deep learning", Chinese Journal of Rock Mechanics and Engineering, vol. 36 No. 12, p. 2861-2871.
Yuan, Xuehan; "Image Pattern Learning and Application Based on Deconvolution Network", Chinese Masters Theses Full-text Batabase Information Science and Technology, Feb. 15, 2017, section 2, 3.
Third Office Action of the Chinese application No. 201810012457. 2, dated Mar. 25, 2021.
Fourth Office Action of the Chinese application No. 201810012457. 2, dated Sep. 2, 2021.
Office Action of the Indian application No. 202027030515, dated Sep. 9, 2021.
Notice of Rejection of the Chinese application No. 201810012457. 2, dated Nov. 19, 2021.

* cited by examiner

METHOD AND DEVICE FOR BLURRING IMAGE BACKGROUND, STORAGE MEDIUM AND ELECTRONIC APPARATUS

CROSS-REFERENCE TO RELATED APPLICATION

This application claims priority to Chinese Patent Application No. 201810012457.2, filed to the Patent Office of the People's Republic of China on Friday, Jan. 5, 2018 and entitled "Method And Device For Blurring Image Background, Storage Medium and Electronic Device", the disclosure of which is hereby incorporated by reference in its entirety.

TECHNICAL FIELD

The application relates to the technical field of communication, and particularly to a method and device for blurring image background, a storage medium and an electronic apparatus.

BACKGROUND

Background blurring is common image processing means and is known very well and used by a large number of users because of its capability in rapidly highlighting a shooting subject. A user may select a background blurring function to generate a background-blurred image. However, in some special complex scenarios, when a background-blurred image is generated, there is usually such a problem that a shooting subject and a background may not be accurately differentiated, namely there may be such a condition at edges of the shooting subject and the background that the shooting subject is blurred or the background is not blurred, blurring accuracy is low and a blurring effect is relatively poor.

SUMMARY

Embodiments of the application provide a method and device for blurring image background, a storage medium and an electronic device, which may improve blurring accuracy and improve a blurring effect.

The embodiments of the application provide a method for blurring image background, which may include the following operations.

An image to be processed is divided into a foreground region and a background region by use of a preset classification model.

A contour edge of a shooting subject is detected in the foreground region.

Blurring is performed on a background of the image to be processed according to the contour edge of the shooting subject.

The embodiments of the application provide a device for blurring image background, which may include a division unit, a detection unit and a processing unit.

The division unit may be configured to divide an image to be processed into a foreground region and a background region by use of a preset classification model.

The detection unit may be configured to detect a contour edge of a shooting subject in the foreground region.

The processing unit may be configured to perform blurring on the background of the image to be processed according to the contour edge of the shooting subject.

The embodiments of the application provide a storage medium having computer programs stored thereon, the computer program running in a computer to enable the computer to execute the method of blurring image background of the embodiments of the application.

The embodiments of the application also provide an electronic device, which may include a processor and a memory. The memory may store a computer program. The electronic device is characterized in that the processor calls the computer program to execute the method for blurring image background of the embodiments of the application.

BRIEF DESCRIPTION OF THE DRAWINGS

In order to describe the technical solutions of the embodiments of the disclosure more clearly, the drawings required to be used in descriptions about the embodiments will be simply introduced below. It is apparent that the drawings described below are only some embodiments of the disclosure. Other drawings may further be obtained by those skilled in the art according to these drawings without creative work.

DETAILED DESCRIPTION

Figure 1:
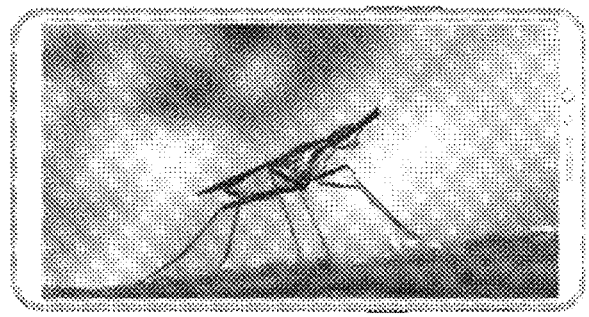
FIG. 1 is a schematic diagram of an application scenario of an image background blurring method according to an embodiment of the application.

Referring to the figures where the same component signs represent the same components, a principle of the application is described with implementation in a proper operating environment as an example. The following descriptions are made based on illustrated specific embodiments of the application and should not be considered to limit other specific embodiments, not elaborated herein, of the application.

In a conventional art, an image background blurring method is low in blurring accuracy and the blurring effect is relatively poor. Therefore, the embodiments of the application provide an image background blurring method to improve the blurring effect. The image background blurring method provided in the embodiments of the application includes the following operations.

An image to be processed is divided into a foreground region and a background region by use of a preset classification model.

A contour edge of a shooting subject is detected in the foreground region.

Blurring is performed on a background of the image to be processed according to the contour edge of the shooting subject.

In an embodiment, before the operation that the image to be processed is divided into the foreground region and the background region by use of the preset classification model, the method further includes the following operations.

A classification tag is set for each of pixels in at least one sample image, the classification tag includes "foreground" or "background".

A deep learning model with a semantic segmentation function is trained by use of a sample set formed from the at least one sample image to obtain the preset classification model.

In an embodiment, the operation that the image to be processed is divided into the foreground region and the background region by use of the preset classification model includes the following operations.

A semantic tag is set for each pixel in the image to be processed, and a semantic segmentation graph is generated according to the semantic tags.

Whether each segmented region in the semantic segmentation graph is the foreground region or the background region is predicted, and a prediction result is output.

In an embodiment, the operation that the semantic tag is set for each pixel in the image to be processed and the semantic segmentation graph is generated according to the semantic tags includes the following operations.

An object class of each pixel in the image to be processed is recognized, and the semantic tag is set for each pixel according to the object class of the pixel.

The pixels with the same semantic tag are marked in the same color to obtain the semantic segmentation graph.

In an embodiment, the operation that the contour edge of the shooting subject is detected in the foreground region includes the following operations.

The shooting subject in the foreground region is determined.

The contour edge of the shooting subject is detected in the foreground region by use of an edge detection algorithm.

In an embodiment, the operation that the shooting subject in the foreground region is determined includes the following operations.

The shooting subject is obtained by recognizing a face in the foreground region through a face recognition method; or the shooting subject is obtained by recognizing a motion object in the foreground region through a motion detection method; or the shooting subject is obtained by recognizing a living body in the foreground region through a living body detection method In an embodiment, the operation that blurring is performed on the background of the image to be processed according to the contour edge of the shooting subject includes the following operation.

A region other than the shooting subject is blurred, and the contour edge of the shooting subject is enhanced by use of an image sharpening algorithm.

In an embodiment, the operation that the region other than the shooting subject is blurted includes the following operation.

The background region and part of the foreground region, other than the shooting subject are blurred, a blurring degree for the background region is greater than a blurring degree for the part of the foreground region, other than the shooting subject.

According to the image background blurring method provided in the embodiments of the application, an execution body of the image background blurring method may be an image background blurring device provided in the embodiments of the application or an electronic device integrated with the image background blurring device. The image background blurring device may be implemented by use of hardware or software. The electronic device may be a device such as a smart phone, a tablet computer, a palm computer, a notebook computer or a desktop computer.

Referring to FIG. 1, FIG. 1 is a schematic diagram of an application scenario of an image background blurring method according to an embodiment of the application. For example, an image background blurring device is an electronic device. The electronic device may divide an image to be processed into a foreground region and a background region by use of a pre-trained classification model, detect a contour edge of a shooting subject (i.e., a shooting target, for example, a person, an object and a scenery) in the foreground region and perform blurring on the background of the image to be processed according to the contour edge of the shooting subject. For example, by taking the contour edge of the shooting subject as a boundary, a region other than the shooting subject may be blurred, to highlight the shooting subject.

Figure 2:
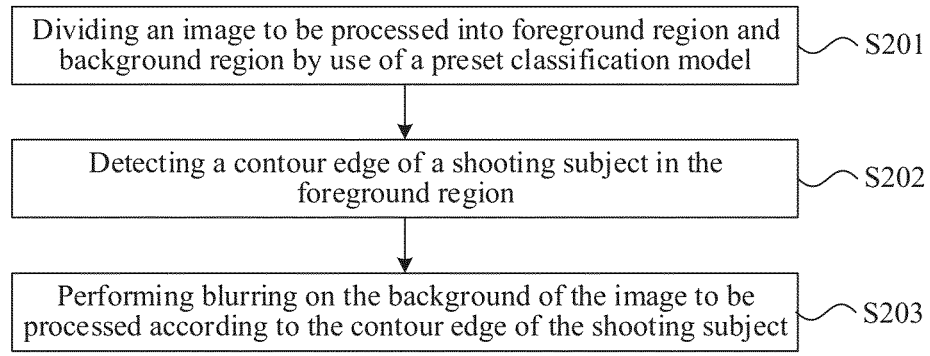
FIG. 2 is a flowchart of an image background blurring method according to an embodiment of the application.

In a preferred embodiment, an image background blurring method is provided. As shown in FIG. 2, a specific flow of the image background blurring method provided in the embodiment of the application may be as follows.

In S201, an image to be processed is divided into a foreground region and a background region by use of a preset classification model.

The preset classification model may be a pre-trained classification model, for example, a deep learning model, a decision tree and a logistic regression model. For improving the accuracy of region recognition, in the embodiment, the preset classification model may specifically be obtained by training the deep learning model with a semantic segmentation function.

Semantic image segmentation briefly refers to, for an image, semantically recognizing each pixel in the image and grouping the pixels with the same semanteme into a class to represent the same object. After the image is semantically segmented, a specific object, for example, a person, a vehicle and a tree, represented by each segmented region may be clearly distinguished according to a segmentation result.

During specific implementation, a large number of sample images may be acquired, and a classification tag is set for each pixel in each sample image, that is, each pixel in the sample image is marked with a category, i.e., foreground or background. A marking process may be implemented in a manual marking manner, or automatic marking may also be implemented in a machine learning manner. After classification marking is completed, the deep learning model with the semantic segmentation function is trained by use of a training set (input: original sample images; ideal output: sample images with the classification tags) formed from the sample images to obtain the preset classification model.

Sample image classification marking and preset classification model training processes may be completed in another device (for example, a server and a computer). When an electronic device is required to perform foreground and background recognition, the preset classification model may be acquired from the other device, to improve image processing efficiency.

The image to be processed refers to an image that background blurring is required to be performed on, and may be acquired by shooting a shooting subject. After the image to be processed is acquired, the image to be processed may be divided into the foreground region and the background region by use of the preset classification model. A specific division method may be as follows.

At first, a semantic tag may be set for each pixel in the image to be processed, and a semantic segmentation graph is generated according to the semantic tags. That is, operations such as convolution, pooling, nonlinear transformation and the like may be executed on the image to be processed input into the preset classification model to obtain a feature map of the image to be processed. The pixels of the image to be processed are recognized one by one according to the feature map of the image to be processed, to obtain an object class of each pixel, the semantic tag is set for each pixel according to a recognition result. The semantic tag represents the object class of the corresponding pixel. The pixels with the same semantic tag are marked in the same color to obtain the semantic segmentation graph. For example, different object classes may be represented with different colors, and the semantic segmentation graph is generated according to the semantic tags. In the semantic segmentation graph, different segmented regions are represented with different colors, and different segmented regions represent different objects. For example, a red segmented region represents a vehicle, a green region represents a ground and a blue segmented region represents a person.

Then, whether each segmented region in the semantic segmentation graph is the foreground region or the background region is predicted, and a prediction result is output. That is, a class of the pixel in each segmented region is predicted by use of the preset classification model, if a class prediction result for the pixel in the segmented region is foreground, the segmented region is a foreground region, or if the class prediction result for the pixel in the segmented region is background, the segmented region is a background region.

Semantic image segmentation and deep learning technologies are combined for region recognition above, so that not only may a foreground and a background be recognized, but also a region where the foreground is located and a region where the background is located may be accurately recognized, and recognition accuracy is improved.

In S202, a contour edge of a shooting object is detected in the foreground region.

During specific implementation, the shooting subject in the foreground region may be determined at first, the shooting subject being a shooting target, for example, a person, an object and a scenery. A specific determination method may be determined by a specific type of the shooting subject. For example, when the shooting subject is a person, the shooting subject in the foreground region may be determined by face recognition, namely a face in the foreground region is recognized through a face recognition method to obtain the shooting subject. When the shooting subject is a motion object, the shooting subject in the foreground region may be determined by motion detection, namely the motion object in the foreground region is detected through a motion detection method to obtain the shooting subject. When the shooting subject is an animal, the shooting subject in the foreground region may be determined by living body detection, namely a living body in the foreground region is detected through a living body detection method to obtain the shooting subject.

After the shooting subject is determined, the contour edge of the shooting subject may be detected in the foreground region by use of an edge detection algorithm. Edge detection is mainly intended to detect a position where a value of a pixel in the image suddenly changes. A common edge detection algorithm includes a Canny algorithm, a Roberts algorithm, a Sobel algorithm, a Prewitt algorithm and the like. A process of detecting the contour edge of the shooting subject in the foreground region will be described below with adoption of the Canny algorithm as an example, and includes the following operations.

In 1), a Gaussian filter is adopted to smooth the image and filter a noise.

For reducing influence of the noise on an edge detection result as much as possible, the noise may be filtered to prevent false detection caused by the noise. For smoothing the image, convolution with an image in the foreground region is performed by use of the Gaussian filter. Through the operation, the image is smoothed to reduce significant noise influence in an edge detector.

In 2), a gradient intensity and direction of each pixel in the image are calculated.

How to calculate the gradient intensity and gradient direction of each pixel in the foreground region will be described below with a Sobel operator as an example.

The Sobel operator filters the image by use of a 3×3 filter to obtain a gradient image. The operator includes two sets of 3×3 matrices, one set for horizontal, and the other for longitudinal, and plane convolution is performed on the two sets of 3×3 matrices and the image to obtain horizontal and longitudinal brightness difference approximations respectively. A represents an original image, $G_x$ and $G_y$ represent matrices used for horizontal and longitudinal edge detection respectively, and calculation formulae thereof are as follows:

$$G_x = \begin{bmatrix} -1 & 0 & 1 \\ -2 & 0 & 2 \\ -1 & 0 & 1 \end{bmatrix} * A, \; G_y = \begin{bmatrix} -1 & -2 & -1 \\ 0 & 0 & 0 \\ 1 & 2 & 1 \end{bmatrix} * A,$$

where * is a convolution sign. Horizontal and longitudinal gradients of each pixel of the image may be calculated according to the following formula to obtain the gradient intensity:

$$G = \sqrt{G_x^2 + G_y^2}$$

Then, the gradient direction may be calculated according to the following formula:

$$\theta = \arctan\left(\frac{G_x}{G_y}\right).$$

In the above example, if the above angle $\theta$ is 0, it is indicated that a corresponding position in the image has a longitudinal edge and a left part is darker than a right part.

In 3), spurious responses brought by edge detection are eliminated by non-maximum suppression.

Non-maximum suppression is an edge sparsification technology. Non-maximum suppression acts for edge "thinning". After gradient calculation of the image, an edge extracted only based on gradient values is still blurry. By non-maximum suppression, all the gradient values other than a local maximum may be suppressed to 0. An algorithm for performing non-maximum suppression on each pixel in the gradient image is as follows: a gradient intensity of a present pixel is compared with gradient intensities of two pixels in positive and negative gradient directions, if the gradient intensity of the present pixel is maximum compared with gradient intensities of the other two pixels, the pixel is reserved as an edge pixel, otherwise the pixel is suppressed.

In 4), real and potential edges are determined by double-threshold detection.

After non-maximum suppression is applied, the left pixels may represent an actual edge in the image more accurately. However, there are still some edge pixels caused by the noise and color changes. For solving these spurious responses, the edge pixels may be filtered by use of weak gradient values and edge pixels with high gradient values may be reserved, which may be implemented by selecting high and low thresholds. If the gradient value of an edge pixel is greater than the high threshold, it is marked as a strong edge pixel; if the gradient value of the edge pixel is less than the high threshold and greater than the low threshold, it is marked as a weak edge pixel; and if the gradient value of the edge pixel is less than the low threshold, it may be suppressed. Selection of the thresholds is determined by a content of a specified input image.

In 5), finally, edge detection is completed by suppressing an isolated weak edge.

Until now, the pixels marked as a strong edge pixel have been determined to form the edge because they are extracted from the real edge in the image. However, there may be some disputes for the weak edge pixels because these pixels may be extracted from the real edge or may also be caused by the noise or the color changes. For obtaining an accurate result, the weak edge caused by the noise or the color changes may be suppressed. Under a normal condition, the weak edge pixels extracted from the real edge may be connected to the strong edge pixels, while the weak edge pixels extracted from noise are not connected to the strong edge pixels. For tracking edge connection, the weak edge pixels and eight neighbor pixels thereof are checked, and if one is a strong edge pixel, the weak edge pixel may be reserved as a real edge pixel.

The contour edge of the shooting subject may be detected in the foreground region based on the Canny algorithm through the above five operations.

In S203, blurring is performed on a background of the image to be processed according to the contour edge of the shooting subject.

Specifically, a region other than the shooting subject may be blurred, and the contour edge of the shooting subject is enhanced by use of an image sharpening algorithm, to maximally highlight the shooting subject.

The operation that the region other than the shooting subject may be blurred may include the following operations: the background region and part of the foreground region, other than the shooting subject are blurred, a blurring degree for the background region is greater than a blurring degree for the part of the foreground region, other than the shooting subject. Therefore, a natural transition is formed from the foreground to the background, and the blurring effect is improved.

In the embodiment, the image to be processed is divided into the foreground region and the background region by use of the preset classification model, so that region division accuracy may be ensured. The contour edge of the shooting subject is detected in the foreground region, so that the edge of the shooting subject may be accurately determined. The image to be processed is blurred according to the contour edge of the shooting subject, so that blurring accuracy is improved, and the blurring effect is improved.

Figure 3:
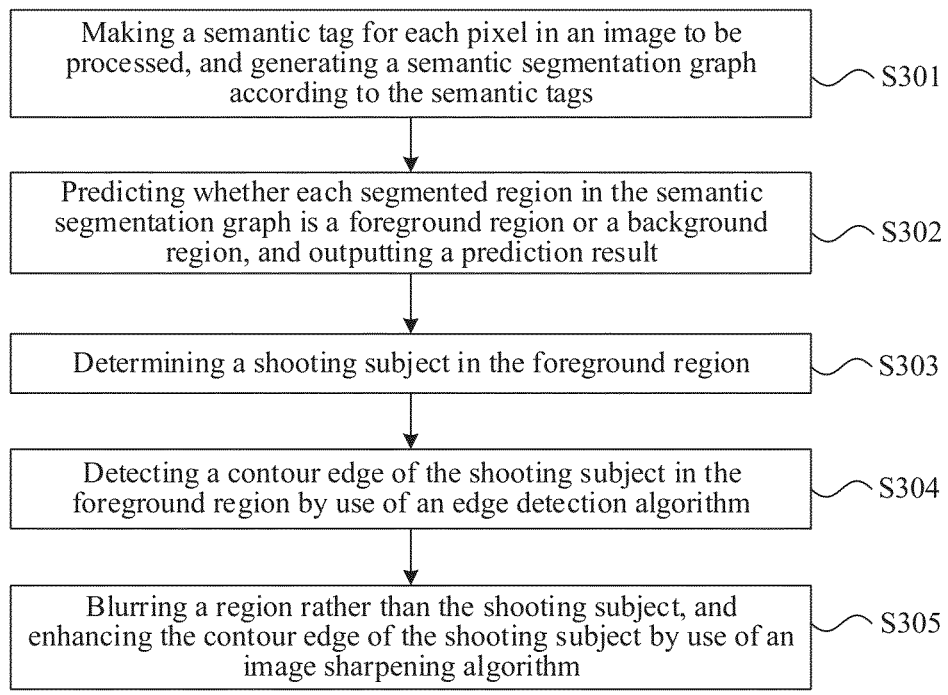
FIG. 3 is another flowchart of an image background blurring method according to an embodiment of the application.

In a preferred embodiment, another image background blurring method is provided. Referring to FIG. 3, the method of the embodiment includes the following operations.

In S301, a semantic tag is set for each pixel in an image to be processed, and a semantic segmentation graph is generated according to the semantic tags.

The image to be processed refers to an image that background blurring is required to be performed on, and the image to be processed may be acquired by shooting a shooting subject. Before the image to be processed is acquired, a pre-trained classification model, i.e., a preset classification model, may be acquired. The preset classification model may be obtained by training a deep learning model with a semantic segmentation function by use of a sample set, each pixel of a sample image in the sample set has a classification tag and the classification tag includes "foreground" or "background".

During specific implementation, the image to be processed may be input into the preset classification mode to execute operations of convolution, pooling, nonlinear transformation and the like on the image to be processed to obtain a feature map of the image to be processed. The pixels of the image to be processed are recognized one by one according to the feature map of the image to be processed to obtain an object class of each pixel. The semantic tag is marked for each pixel according to the recognition result. The semantic tag represents the object class of the corresponding pixel. The pixels with the same semantic tag are marked with the same color to obtain the semantic segmentation graph. For example, different object classes may be represented with different colors, and the semantic segmentation graph is generated according to the semantic tags. In the semantic segmentation graph, different segmented regions are represented with different colors, and different segmented regions represent different objects.

Figure 4:
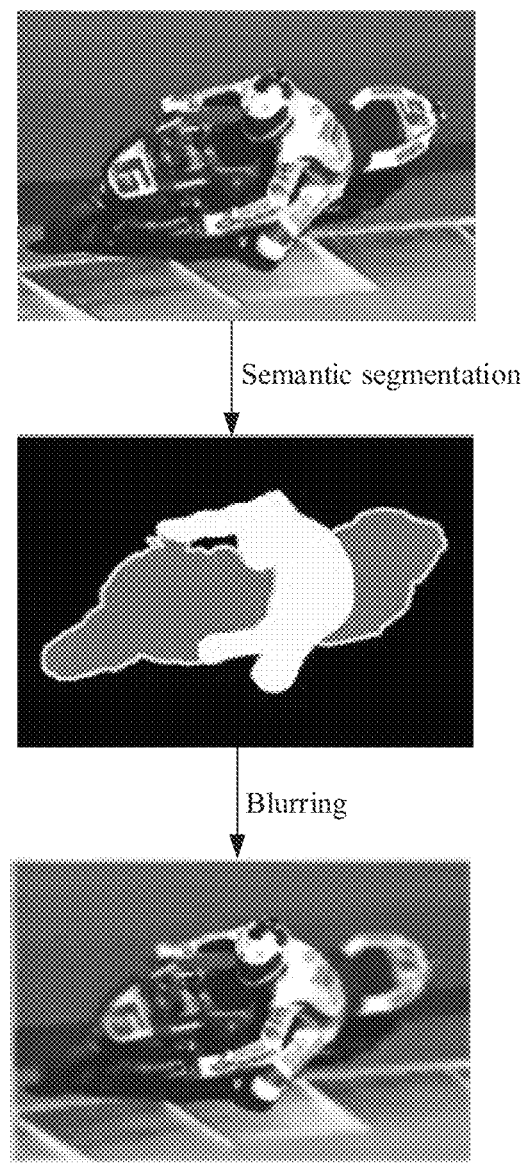
FIG. 4 is a schematic diagram of an image background blurring effect according to an embodiment of the application.

In a specific embodiment, the image to be processed is shown, for example, in the first picture in FIG. 4. The semantic segmentation graph generated after semantic segmentation of the image to be processed may be shown in the second picture in FIG. 4, a person, a vehicle and a road are in different segmented regions and different segmented regions are represented with different colors.

In S302, whether each segmented region in the semantic segmentation graph is the foreground region or the background region is predicted, and a prediction result is output.

That is, a class of the pixel in each segmented region is predicted by use of the preset classification model, if a class prediction result of the pixel in the segmented region is foreground, the segmented region is a foreground region, or if the class prediction result of the pixel in the segmented region is background, the segmented region is a background region.

In the example shown in FIG. 4, for example, the following result is obtained by prediction with the preset classification model: a region where the vehicle and the person are located is a foreground region and a region where the road is located is a background region.

In S303, a shooting subject in the foreground region is determined.

The shooting subject is a shooting target, for example, a person, an object and a scenery. A specific determination method may be determined by a specific type of the shooting subject. For example, when the shooting subject is a person, the shooting subject in the foreground region may be determined by face recognition; when the shooting subject is a motion object, the shooting subject in the foreground region may be determined by motion detection; and when the shooting subject is an animal, the shooting subject in the foreground region may be determined by living body detection.

In S304, a contour edge of the shooting subject is detected in the foreground region by use of an edge detection algorithm.

A specific detection method may refer to the descriptions in the abovementioned embodiment and will not be elaborated herein.

In S305, a region other than the shooting subject is blurred, and the contour edge of the shooting subject is enhanced by use of an image sharpening algorithm.

Specifically, the region other than the shooting subject may be blurred, and the contour edge of the shooting subject is enhanced by use of the image sharpening algorithm, to maximally highlight the shooting subject.

The operation that the region other than the shooting subject is blurred may include the following operations: the background region and part of the foreground region, other than the shooting subject are blurred, a blurring degree for the background region is greater than a blurring degree for the part of the foreground region, other than the shooting subject. Therefore, a natural transition is formed between the foreground and the background, and the blurring effect is improved.

In the example shown in FIG. 4, after it is determined that the shooting subject is the person, a contour edge of the person may be detected, enhancement processing is performed on the contour edge of the person, and the vehicle and the road are blurred. A blurring degree for the road may be greater than a blurring degree for the vehicle, so that a blurred image with a natural transition effect may be obtained, and the shooting subject may be maximally highlighted.

In the embodiment, the image to be processed is divided into the foreground region and the background region by use of the preset classification model, so that region division accuracy may be ensured. The contour edge of the shooting subject is detected in the foreground region, so that the edge of the shooting subject may be accurately determined. The image to be processed is blurred according to the contour edge of the shooting subject, so that blurring accuracy is improved, and the blurring effect is improved.

The embodiments of the application also provide an image background blurring device, which includes a division unit, a detection unit and a processing unit as follows.

The division unit is configured to divide an image to be processed into a foreground region and a background region by use of a preset classification model.

The detection unit is configured to detect a contour edge of a shooting subject in the foreground region.

The processing unit is configured to perform blurring on a background of the image to be processed according to the contour edge of the shooting subject.

In an embodiment, the device further includes a marking unit and a training unit.

The marking unit is configured to set a classification tag for each of pixels in at least one sample image, the classification tag includes "foreground" or "background".

The training unit is configured to obtain the preset classification model by training a deep learning model with a semantic segmentation function by use of a sample set formed from the at least one sample image.

In an embodiment, the division unit includes a generation subunit and a prediction subunit.

The generation subunit is configured to set a semantic tag for each pixel in the image to be processed and generate a semantic segmentation graph according to the semantic tags.

The prediction subunit is configured to predict whether each segmented region in the semantic segmentation graph is the foreground region or the background region and output a prediction result.

In an embodiment, the generation subunit is specifically configured to:

recognize an object class of each pixel in the image to be processed and make the semantic tag for each pixel according to the object class of the pixel; and mark the pixels with the same semantic tag in the same color, to obtain the semantic segmentation graph.

In an embodiment, the detection unit includes a determination subunit and a detection subunit.

The determination subunit is configured to determine the shooting subject in the foreground region.

The detection subunit is configured to detect the contour edge of the shooting subject in the foreground region by use of an edge detection algorithm.

In an embodiment, the determination subunit is specifically configured to:

obtaining the shooting subject by recognizing a face in the foreground region through a face recognition method; or obtaining the shooting subject by recognizing a motion object in the foreground region through a motion detection method; or obtaining the shooting subject by recognizing a living body in the foreground region through a living body detection method.

In an embodiment, the processing unit is specifically configured to:

blurring a region other than the shooting subject and enhance the contour edge of the shooting subject by use of an image sharpening algorithm.

In an embodiment, the operation that the processing unit blurs the region other than the shooting subject includes the following operation.

The processing unit blurs the background region and part of the foreground region, other than the shooting subject, a blurring degree for the background region is greater than a blurring degree for the part of the foreground region, other than the shooting subject.

Figure 5:
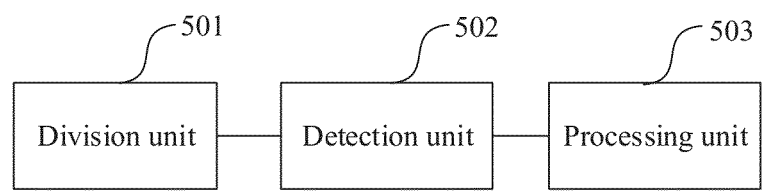
FIG. 5 is a structure diagram of an image background blurring device according to an embodiment of the application.

In a preferred embodiment, an image background blurring device is also provided. As shown in FIG. 5, the image background blurring device may specifically be integrated into an electronic device. The image background blurring device includes a division unit 501, a detection unit 502 and a processing unit 503 as follows.

The division unit 501 is configured to divide an image to be processed into a foreground region and a background region by use of a preset classification model.

The detection unit 502 is configured to detect a contour edge of a shooting subject in the foreground region.

The processing unit 503 is configured to perform blurring on a background of the image to be processed according to the contour edge of the shooting subject.

Figure 6:
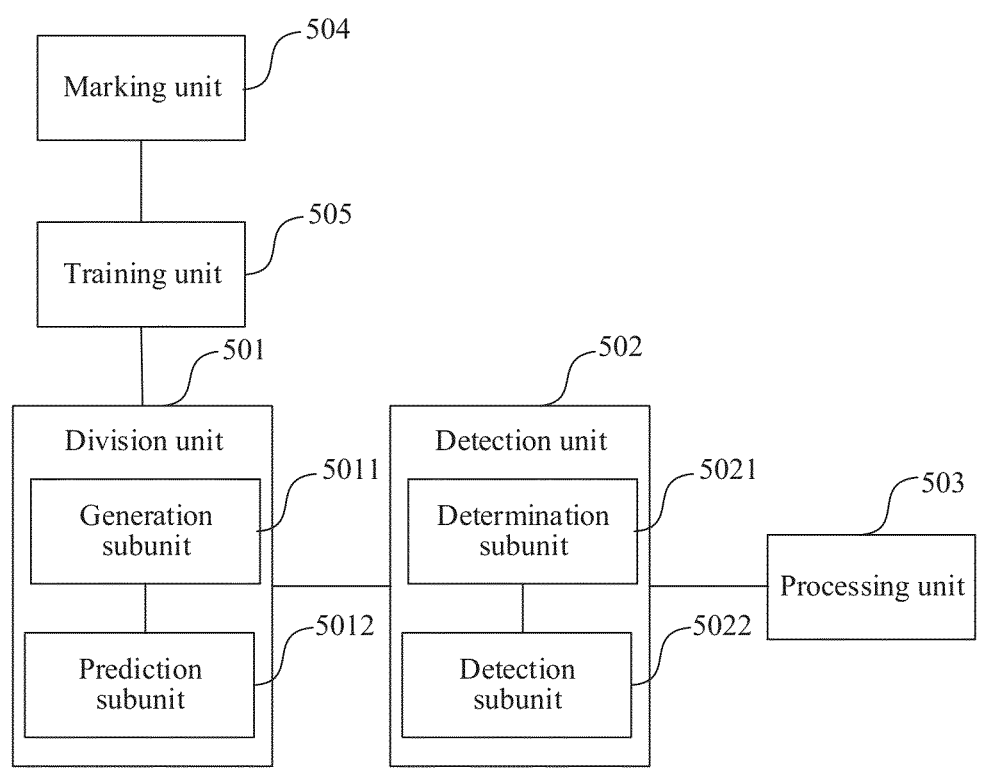
FIG. 6 is another structure diagram of an image background blurring device according to an embodiment of the application.

In some embodiments, as shown in FIG. 6, the device further includes a marking unit 504 and a training unit 505.

The marking unit 504 is configured to set a classification tag for each of pixels in at least one sample image, the classification tag includes "foreground" or "background".

The training unit 505 is configured to obtain the preset classification model by training a deep learning model with a semantic segmentation function by use of a sample set formed from the at least one sample image.

In some embodiments, as shown in FIG. 6, the division unit 501 includes a generation subunit 5011 and a prediction subunit 5012.

The generation subunit 5011 is configured to set a semantic tag for each pixel in the image to be processed and generate a semantic segmentation graph according to the semantic tags.

The prediction subunit 5012 is configured to predict whether each segmented region in the semantic segmentation graph is the foreground region or the background region and output a prediction result.

In some embodiments, the generation subunit 5011 is specifically configured to:

recognize an object class of each pixel in the image to be processed and set the semantic tag for each pixel according to the object class of the pixel; and mark the pixels with the same semantic tag in the same color to obtain the semantic segmentation graph.

In some embodiments, as shown in FIG. 6, the detection unit 502 includes a determination subunit 5021 and a detection subunit 5022.

The determination subunit 5021 is configured to determine the shooting subject in the foreground region.

The detection subunit 5022 is configured to detect the contour edge of the shooting subject in the foreground region by use of an edge detection algorithm.

In some embodiments, the determination subunit 5021 is specifically configured to:

obtain the shooting subject by recognizing a face in the foreground region through a face recognition method; or obtain the shooting subject by recognizing a motion object in the foreground region through a motion detection method, or obtain the shooting subject by recognizing a living body in the foreground region through a living body detection method.

In some embodiments, the processing unit 503 is specifically configured to:

blurring a region other than the shooting subject and enhance the contour edge of the shooting subject by use of an image sharpening algorithm.

In some embodiments, the processing unit 503 blurs the region other than the shooting subject according to the following manner.

The background region and part of the foreground region, other than the shooting subject are blurred, a blurring degree for the background region is greater than a blurring degree for the part of the foreground region, other than the shooting subject.

It can be seen from the above that, according to the embodiment, in an electronic device, the division unit 501 divides the image to be processed into the foreground region and the background region by use of the preset classification model, so that region division accuracy is ensured; the detection unit 502 detects the contour edge of the shooting subject in the foreground region, so that the edge of the shooting subject may be accurately determined; and finally, the processing unit 503 performs blurring on the background of the image to be processed according to the contour edge of the shooting subject, so that blurring accuracy is improved, and a blurring effect is improved.

During specific implementation, each of the modules may be implemented as an independent entity, and may also be freely combined for implementation as the same or a plurality of entities. Specific implementation of each of the modules may refer to the method embodiment and will not be elaborated here.

Figure 7:
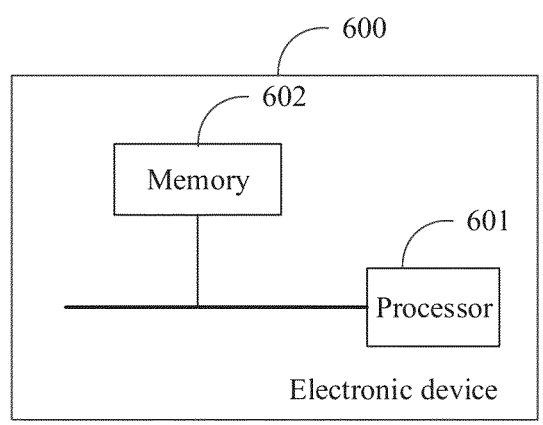
FIG. 7 is a structure diagram of an electronic device according to an embodiment of the application.

The embodiments of the application also provide an electronic device. Referring to FIG. 7, the electronic device 600 includes a processor 601 and a memory 602. The processor 601 is electrically connected with the memory 602.

The processor 600 is a control center of the electronic device 600, connects each part of the whole electronic device by use of various interfaces and lines and executes various functions and data processing of the electronic device 600 by running or loading a computer program stored in the memory 602 and calling data stored in the memory 602, thereby monitoring the whole electronic device 600.

The memory 602 may be configured to store a software program and a module. The processor 601 runs the computer program and module stored in the memory 602, thereby executing various function applications and data processing. The memory 602 may mainly include a program storage region and a data storage region. The program storage region may store an operating system, a computer program required by at least one function (for example, a sound playing function and an image playing function) and the like. The data storage region may store data created according to use of the electronic device and the like. In addition, the memory 602 may include a high-speed Random Access Memory (RAM) and may further include a nonvolatile memory, for example, at least one disk storage device, flash memory device or other volatile solid-state storage device. Correspondingly, the memory 602 may further include a memory controller for the processor 601 to access the memory 602.

In the embodiments of the application, the processor 601 in the electronic device 600 may load an instruction corresponding to a process of one or more than one computer program into the memory 602 according to the following operations and the processor 601 runs the computer program stored in the memory 602, thereby realizing various functions as follows.

An image to be processed is divided into a foreground region and a background region by use of a preset classification model.

A contour edge of a shooting subject is detected in the foreground region.

Blurring is performed on a background of the image to be processed according to the contour edge of the shooting subject.

In some implementation modes, before the operation that the image to be processed is divided into the foreground region and the background region by use of the preset classification model, the processor 601 may further execute the following operations.

A classification tag is set for each of pixels in at least one sample image, the classification tag includes "foreground" or "background".

The preset classification model is obtained by training a deep learning model with a semantic segmentation function by use of a sample set formed from the at least one sample image.

In some implementation modes, when the image to be processed is divided into the foreground region and the background region by use of the preset classification model, the processor 601 may specifically execute the following operations.

A semantic tag is set for each pixel in the image to be processed, and a semantic segmentation graph is generated according to the semantic tags.

Whether each segmented region in the semantic segmentation graph is the foreground region or the background region is predicted, and a prediction result is output.

In some implementation modes, when the semantic tag is set for each pixel in the image to be processed and the semantic segmentation graph is generated according to the semantic tags, the processor 601 may specifically execute the following operations.

An object class of each pixel in the image to be processed is recognized, and the semantic tag is set for each pixel according to the object class of the pixel.

The pixels with the same semantic tag are marked in the same color to obtain the semantic segmentation graph.

In some implementation modes, when the contour edge of the shooting subject is detected in the foreground region, the processor 601 may specifically execute the following operations.

The shooting subject in the foreground region is determined.

The contour edge of the shooting subject is detected in the foreground region by use of an edge detection algorithm.

In some implementation modes, when the shooting subject in the foreground region is determined, the processor 601 may specifically execute the following operations.

The shooting subject is obtained by recognizing a face in the foreground region through a face recognition method; or the shooting subject is obtained by recognizing a motion object in the foreground region through a motion detection method; or the shooting subject is obtained by recognizing a living body in the foreground region through a living body detection method.

In some implementation modes, when blurring is performed on a background of the image to be processed according to the contour edge of the shooting subject, the processor 601 may specifically execute the following operation.

A region other than the shooting subject is blurred, and the contour edge of the shooting subject is enhanced by use of an image sharpening algorithm.

In some implementation modes, when the region other than the shooting subject is blurred, the processor 601 may specifically execute the following operation.

The background region and part of the foreground region, other than the shooting subject are blurred, a blurring degree for the background region is greater than a blurring degree for the part of the foreground region, other than the shooting subject.

It can be seen from the above that, according to the electronic device of the embodiments of the application, the image to be processed is divided into the foreground region and the background region by use of the preset classification model, so that region division accuracy may be ensured. The contour edge of the shooting subject is detected in the foreground region, so that the edge of the shooting subject may be accurately determined. Blurring is performed on a background of the image to be processed according to the contour edge of the shooting subject, so that blurring accuracy is improved, and a blurring effect is improved.

Figure 8:
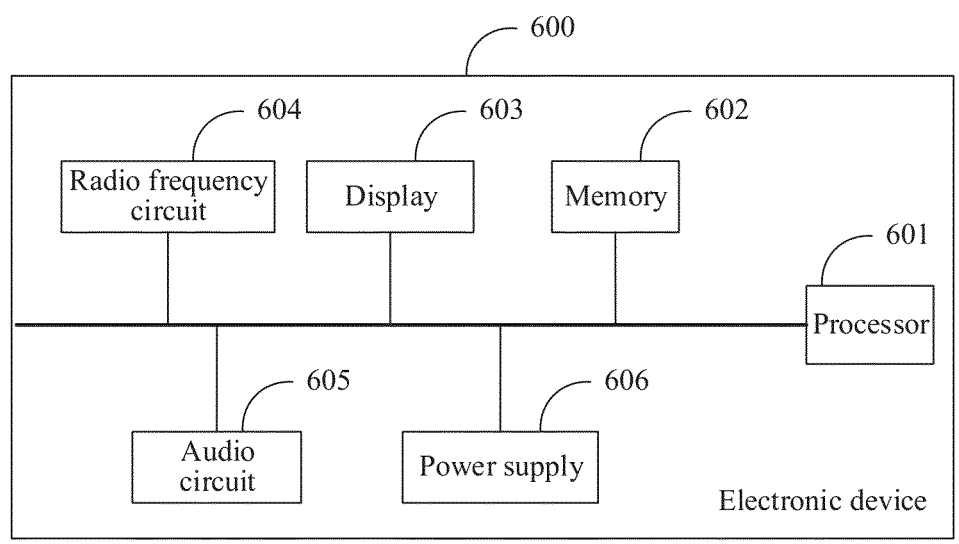
FIG. 8 is another structure diagram of an electronic device according to an embodiment of the application.

Referring to FIG. 8, in some implementation modes, the electronic device 600 may further include a display 603, a radio frequency circuit 604, an audio circuit 605 and a power supply 606. The display 603, the radio frequency circuit 604, the audio circuit 605 and the power supply 606 are electrically connected with the processor 601 respectively.

The display 603 may be arranged to display information input by a user or information provided for the user and various graphical user interfaces. These graphical user interfaces may be formed by graphics, texts, icons, videos and any combination thereof. The display 603 may include a display panel. In some implementation, the display panel may be configured in form of a Liquid Crystal Display (LCD) and an Organic Light-Emitting Diode (OLED).

The radio frequency circuit 604 may be arranged to transmit and receive radio frequency signals to establish wireless communication with a network device or another electronic device through wireless communication and implement signal transmission and reception with the network device or the other electronic device.

The audio circuit 605 may be arranged to provide an audio interface between the user and the electronic device through a loudspeaker and a microphone.

The power supply 606 may be arranged to supply power to each part of the electronic device 600. In some embodiments, the power supply 606 may be logically connected with the processor 601 through a power management system, thereby realizing functions of charging and discharging management, power consumption management and the like through the power management system.

Although not shown in FIG. 8, the electronic device 600 may further include a camera, a Bluetooth module and the like, which will not be elaborated herein.

The embodiments of the application also provide a storage medium, which stores a computer program, the computer program running in a computer to enable the computer to execute an image background blurring method in any abovementioned embodiment, for example, including that: an image to be processed is divided into a foreground region and a background region by use of a preset classification model: a contour edge of a shooting subject is detected in the foreground region; and blurring is performed on a background of the image to be processed according to the contour edge of the shooting subject.

In the embodiments of the application, the storage medium may be a magnetic disk, an optical disk, a Read Only Memory (ROM), a RAM or the like.

Each embodiment in the abovementioned embodiments is described with different emphases, and undetailed parts in a certain embodiment may refer to related descriptions in the other embodiments.

It is to be noted that, for the image background blurring method of the embodiments of the application, those of ordinary skill in the art should know that all or part of the flows in the image background blurring method of the embodiments of the application may be completed by controlling related hardware through a computer program, the computer program may be stored in a computer-readable storage medium, for example, stored in the memory of the electronic device, and is executed by at least one processor in the electronic device, and an execution process may include, for example, the flow of the embodiment of the image background blurring method. The storage medium may be a magnetic disk, an optical disk, a ROM, RAM and the like.

For the image background blurring device of the embodiments of the application, each function module may be integrated into a processing chip, each module may also physically exist independently, or two or more than two modules may be integrated into a module. The integrated module may be implemented in a hardware form and may also be implemented in form of a software function module. When being implemented in form of the software function module and sold or used as an independent product, the integrated module may also be stored in a computer-readable storage medium, the storing medium being, for example, a ROM, a magnetic disk or an optical disk.

The image background blurring method and device, storage medium and electronic device provided in the embodiments of the application are introduced above in detail, the principle and implementation modes of the application are elaborated with specific examples herein, and the descriptions made to the embodiments are only adopted to help the method of the application and the core concept thereof to be understood. In addition, those skilled in the art may make variations to the specific implementation modes and the application scope according to the concept of the application. From the above, the contents of the specification should not be understood as limits to the application.

The invention claimed is:

1. A method for blurring image background, comprising:
dividing an image to be processed into a foreground region and a background region by use of a preset classification model;
detecting a contour edge of a shooting subject in the foreground region; and
performing blurring on a background of the image to be processed according to the contour edge of the shooting subject,
wherein performing blurring on the background of the image to be processed according to the contour edge of the shooting subject comprises:
blurring a region other than the shooting subject; and
enhancing the contour edge of the shooting subject by use of an image sharpening algorithm,
wherein blurring the region other than the shooting subject comprises:
blurring the background region and part of the foreground region, other than the shooting subject, wherein a blurring degree for the background region is greater than a blurring degree for the part of the foreground region, other than the shooting subject,
wherein detecting the contour edge of the shooting subject in the foreground region comprises:
determining the shooting subject in the foreground region; and
detecting the contour edge of the shooting subject in the foreground region by use of an edge detection algorithm,
wherein detecting the contour edge of the shooting subject in the foreground region by use of an edge detection algorithm comprises:
smoothing the image to be processed and filtering a noise by using a Gaussian filter;
calculating a gradient intensity and direction of each pixel in the image to be processed;
eliminating, by non-maximum suppression, spurious responses brought by edge detection;
determining real and potential edges by double-threshold detection; and
completing edge detection by suppressing an isolated weak edge.

2. The method of claim 1, further comprising: before the operation of dividing the image to be processed into the foreground region and the background region by use of the preset classification model,
setting a classification tag for each of pixels in at least one sample image, wherein the classification tag comprises "foreground" or "background"; and
obtaining the preset classification model by training a deep learning model with a semantic segmentation function by use of a sample set formed from the at least one sample image.

3. The method of claim 2, wherein dividing the image to be processed into the foreground region and the background region by use of a preset classification model comprises:
setting a semantic tag for each pixel in the image to be processed;
generating a semantic segmentation graph according to the semantic tags;
predicting whether each segmented region in the semantic segmentation graph is the foreground region or the background region; and
outputting a prediction result.

4. The method of claim 3, wherein setting the semantic tag for each pixel in the image to be processed and generating the semantic segmentation graph according to the semantic tags comprises:
recognizing an object class of each pixel in the image to be processed,
setting the semantic tag for each pixel according to the object class of the pixel; and
marking pixels with a same semantic tag in a same color, to obtaining the semantic segmentation graph.

5. The image background blurring method of claim 1, wherein determining the shooting subject in the foreground region comprises:
obtaining the shooting subject, by recognizing a face in the foreground region through a face recognition method; or
obtaining the shooting subject, by recognizing a motion object in the foreground region through a motion detection method; or
obtaining the shooting subject, by recognizing a living body in the foreground region through a living body detection method.

6. A non-transitory storage medium having computer programs stored thereon, the computer programs running in a computer to enable the computer to execute the following operations:
dividing an image to be processed into a foreground region and a background region by use of a preset classification model;
detecting a contour edge of a shooting subject in the foreground region; and
performing blurring on a background of the image to be processed according to the contour edge of the shooting subject,
wherein performing blurring on the background of the image to be processed according to the contour edge of the shooting subject comprises:
blurring a region other than the shooting subject; and
enhancing the contour edge of the shooting subject by use of an image sharpening algorithm,
wherein blurring the region other than the shooting subject comprises:
blurring the background region and part of the foreground region, other than the shooting subject, wherein a blurring degree for the background region is greater than a blurring degree for the part of the foreground region, other than the shooting subject,
wherein detecting the contour edge of the shooting subject in the foreground region comprises:
determining the shooting subject in the foreground region; and
detecting the contour edge of the shooting subject in the foreground region by use of an edge detection algorithm, wherein detecting the contour edge of the shooting subject in the foreground region by use of an edge detection algorithm comprises:

smoothing the image to be processed and filtering a noise by using a Gaussian filter;

calculating a gradient intensity and direction of each pixel in the image to be processed;

eliminating, by non-maximum suppression, spurious responses brought by edge detection;

determining real and potential edges by double-threshold detection; and completing edge detection by suppressing an isolated weak edge.

7. An electronic device, comprising a processor and a memory, wherein the memory stores a computer program, and the processor calls the computer program, thereby executing the following operations:

dividing an image to be processed into a foreground region and a background region by use of a preset classification model;

detecting a contour edge of a shooting subject in the foreground region; and performing blurring on a background of the image to be processed according to the contour edge of the shooting subject, wherein, when performing blurring on the background of the image to be processed according to the contour edge of the shooting subject, the processor is specifically configured to execute the following operation:

blurring a region other than the shooting subject, and enhancing the contour edge of the shooting subject by use of an image sharpening algorithm, wherein, when performing blurring on the region other than the shooting subject, the processor is specifically configured to execute the following operation:

blurring the background region and part of the foreground region, other than the shooting subject, wherein a blurring degree for the background region is greater than a blurring degree for the part of the foreground region, other than the shooting subject, wherein, when detecting the contour edge of the shooting subject in the obtained foreground region, the processor is specifically configured to execute the following operations:

determining the shooting subject in the foreground region; and detecting the contour edge of the shooting subject in the foreground region by use of an edge detection algorithm, wherein, when detecting the contour edge of the shooting subject in the foreground region by use of an edge detection algorithm, the processor is specifically configured to execute the following operations:

smoothing the image to be processed and filtering a noise by using a Gaussian filter;

calculating a gradient intensity and direction of each pixel in the image to be processed;

eliminating, by non-maximum suppression, spurious responses brought by edge detection;

determining real and potential edges by double-threshold detection; and completing edge detection by suppressing an isolated weak edge.

8. The electronic device of claim 7, wherein, before dividing the image to be processed into the foreground region and the background region by use of the preset classification model, the processor is further configured to execute the following operations:

setting a classification tag for each of pixels in at least one sample image, wherein the classification tag comprises "foreground" or "background"; and obtaining the preset classification model by training a deep learning model with a semantic segmentation function by use of a sample set formed from the at least one sample image.

9. The electronic device of claim 8, wherein, when dividing the image to be processed into the foreground region and the background region by use of the preset classification model, the processor is specifically configured to execute the following operations:

setting a semantic tag for each pixel in the image to be processed;

generating a semantic segmentation graph according to the semantic tags;

predicting whether each segmented region in the semantic segmentation graph is the foreground region or the background region; and outputting a prediction result.

10. The electronic device of claim 9, wherein, when setting the semantic tag for each pixel in the image to be processed and generating the semantic segmentation graph according to the semantic tags, the processor is specifically configured to execute the following operations:

recognizing an object class of each pixel in the image to be processed, and setting the semantic tag for each pixel according to the object class of the pixel; and marking the pixels with the same semantic tag in the same color, to obtain the semantic segmentation graph.

11. The electronic device of claim 7, wherein, when determining the shooting subject in the foreground region, the processor is specifically configured to execute the following step:

obtaining the shooting subject by recognizing a face in the foreground region through a face recognition method; or obtaining the shooting subject by recognizing a motion object in the foreground region through a motion detection method; or obtaining the shooting subject by recognizing a living body in the foreground region through a living body detection method.

12. The non-transitory storage medium of claim 6, wherein the computer programs running in a computer to enable the computer to further execute the following operations:

before the operation of dividing the image to be processed into the foreground region and the background region by use of the preset classification model, setting a classification tag for each of pixels in at least one sample image, wherein the classification tag comprises "foreground" or "background"; and obtaining the preset classification model by training a deep learning model with a semantic segmentation function by use of a sample set formed from the at least one sample image.

13. The non-transitory storage medium of claim 12, wherein dividing the image to be processed into the foreground region and the background region by use of a preset classification model comprises:

setting a semantic tag for each pixel in the image to be processed;

generating a semantic segmentation graph according to the semantic tags;

predicting whether each segmented region in the semantic segmentation graph is the foreground region or the background region; and outputting a prediction result.

14. The non-transitory storage medium of claim 13, wherein setting the semantic tag for each pixel in the image to be processed and generating the semantic segmentation graph according to the semantic tags comprises:

recognizing an object class of each pixel in the image to be processed, setting the semantic tag for each pixel according to the object class of the pixel; and marking pixels with a same semantic tag in a same color, to obtaining the semantic segmentation graph.

* * * * *